United States Patent
Terada et al.

(10) Patent No.: US 7,870,921 B2
(45) Date of Patent: Jan. 18, 2011

(54) ELECTRIC BICYCLE HAVING A FRONT COVER UNIT

(75) Inventors: Junji Terada, Shizuoka-ken (JP);
Tomohiro Ono, Shizuoka-ken (JP);
Masaya Fujishiro, Shizuoka-ken (JP);
Motokuni Nishiyama, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 947 days.

(21) Appl. No.: 11/481,424

(22) Filed: Jul. 5, 2006

(65) Prior Publication Data

US 2007/0017723 A1 Jan. 25, 2007

(30) Foreign Application Priority Data

Jul. 5, 2005 (JP) .............................. 2005-195797

(51) Int. Cl.
*B62M 23/02* (2010.01)
(52) U.S. Cl. ...................... 180/205; 180/220; 180/219; 180/227; 180/228
(58) Field of Classification Search ................. 180/220, 180/219, 205–207; 340/439
See application file for complete search history.

(56) References Cited

U.S. PATENT DOCUMENTS

| 3,921,745 | A |   | 11/1975 | McCulloch et al. |
| 5,222,572 | A | * | 6/1993  | Yamagiwa et al. .......... 180/220 |
| 5,421,427 | A | * | 6/1995  | Ogawa et al. ............... 180/220 |
| 5,595,257 | A |   | 1/1997  | Yoshida et al. |
| 5,798,702 | A | * | 8/1998  | Okamoto et al. ......... 340/636.1 |
| 6,011,366 | A |   | 1/2000  | Murakami et al. |
| 6,144,125 | A | * | 11/2000 | Birkestrand et al. ....... 310/68 B |
| 2002/0014366 | A1 | * | 2/2002 | Turner ........................ 180/220 |
| 2006/0021814 | A1 | * | 2/2006 | Hasegawa et al. ........... 180/219 |

FOREIGN PATENT DOCUMENTS

| EP | 0 604 981 A2 |   | 7/1994  |
| EP | 1 447 282 A2 |   | 8/2004  |
| EP | 1447282 A2 | * | 8/2004  |
| JP | 2000-261911 |   | 9/2000  |
| JP | 2001-341685 |   | 12/2001 |
| WO | WO 00/43259 A1 |   | 7/2000  |

OTHER PUBLICATIONS

European Search Report Mailed on Oct. 30, 2006 in Corresponding European Patent Application No. 06013955.7.

* cited by examiner

*Primary Examiner*—Lesley Morris
*Assistant Examiner*—Jacob Knutson
(74) *Attorney, Agent, or Firm*—Keating & Bennett, LLP

(57) ABSTRACT

An electric bicycle having a front cover unit for housing a controller having an indicator is provided. The front cover unit is attached to the body of the electric bicycle substantially near a steering shaft. The controller can be attached to an interior portion of the front cover unit. The indicator can be attached to the controller and can be exposed through a window in the front cover unit. The front cover unit can comprise a front surface cover member and a rear surface cover member. The front surface cover member can be attached to and detached from the rear surface cover member. The rear surface cover member can have a first recessed portion having a first window for exposing the indicator and a second recessed portion having a second window for exposing a power switch.

20 Claims, 6 Drawing Sheets

ELECTRIC BICYCLE HAVING A FRONT COVER UNIT

CROSS-REFERENCE TO RELATED APPLICATIONS

This application is based on and claims priority under 35 U.S.C. §119(a)-(d) to Japanese Patent Application No. 2005-195797, filed Jul. 5, 2005, the entire contents of which is hereby incorporated by reference.

BACKGROUND OF THE INVENTION

1. Field of the Invention

The present invention relates to an electric bicycle and, in particular, to an electric bicycle with a pedal section for inputting a drive force and an electric motor for generating a drive force.

2. Description of the Related Art

An electric bicycle can have a pedal section for inputting a driving force from a rider and an electric motor for generating a driving force. An operation box having a switch and an electrically operative indicator can be generally disposed adjacent to a coupling portion of the electric bicycle. The coupling portion couples a head tube and a down tube with each other near a fore end of the bicycle. As a result, this configuration allows the rider to readily operate the switch or easily watch the indicator while riding the electric bicycle.

Electric bicycles also commonly have a controller. The controller adjusts the electric power supplied to the electric motor from a battery and controls a rotational speed of the electric motor. In such electric bicycles, the controller can be disposed adjacent to a pedal crankshaft near the pedal section which is near an aft end of the bicycle. A wire harness, which is formed from a plurality of wires, connects the controller (disposed at an aft end of the bicycle) to the operation box (disposed at a fore end of the bicycle). Such constructions are taught, for instance, by Japanese Patent Publication No. JP-A-2000-261911.

The type of electric bicycle described above has a number of shortcomings. For example, a container is used to house both the operation box and the controller of the electric bicycle in order to protect these components from external elements, such as water and dust. However, in the electric bicycles discussed above, the operation box and the controller are spaced apart from each other. Therefore, the operation box and the controller each require an individual housing container. Consequently, the number of components used to construct prior art electric bicycles is increased which can result in increased manufacturing and production costs. In addition, the structural components necessary to individually attach the operation box and the controller to the body of the bicycle likewise is increased. Again, the number of parts required to construct these electric bicycles is unnecessarily increased which can result in increased production costs. Another shortcoming of prior art electric bicycles is that the wire harness connecting the operation box to the controller is typically relatively long because the operation box and the controller are spaced a significant distance from each other on the electric bicycle. As a result, installation and placement of the wire harness can be problematic.

SUMMARY OF THE INVENTION

An object of the present invention is to provide an electric bicycle having a front cover unit housing at least a controller and an indicator so that the number of components of the electric bicycle is reduced thereby reducing the cost of manufacturing and producing the electric bicycle.

Accordingly, one aspect of the present invention involves an electric bicycle comprising a body having a frame. A steering shaft is disposed substantially near a fore end of the bicycle. The steering shaft is pivotable about an axis defined by the steering shaft. Handlebars are coupled to the steering shaft for steering the bicycle. A pedal section is supported by the frame and is configured to input a drive force to provide forward translation of the bicycle. An electric motor for generating driving force is also supported by the frame. A battery for charging the electric motor is likewise supported by the frame. A controller is configured to control rotational torque produced by the electric motor. An indicator is coupled to the controller and is configured to visually indicate an operational condition of the bicycle. A front cover unit is disposed substantially near the steering shaft. The front cover unit defines an interior space that contains the controller and the indicator at least partially therein.

Another aspect of the present invention also involves an electric bicycle comprising a body having a frame. The frame is supported by a wheel which rotates about a generally horizontal axis. A steering shaft is disposed substantially near a fore end of the bicycle and is pivotable about an axis defined by the steering shaft. Handlebars are coupled to the steering shaft for steering the bicycle. A seat is supported by the frame and is configured to seat at least one rider. A pedal section is also supported by the frame and is configured to input a driving force to provide forward translation of the bicycle. An electric motor is configured to generate a driving force. A battery is configured to charge the electric motor and is likewise supported by the frame. A controller is configured to control rotational torque produced by the electric motor. An indicator is coupled to the controller. A front cover unit is disposed substantially near the steering shaft. The front cover unit defines an interior space that contains the controller and the indicator at least partially therein. In addition, the front cover unit comprises a front surface cover member and a rear surface cover member. In this embodiment, the front surface cover member is coupled to the rear surface cover member.

Another aspect of the present invention involves an electric bicycle comprising a body having a frame. The frame is supported by a wheel which rotates about a generally horizontal axis. A steering shaft is disposed substantially near a fore end of the bicycle and is pivotable about an axis defined by the steering shaft. Handlebars are coupled to the steering shaft. A seat is supported by the frame and is configured to seat at least one rider. A pedal section is also supported by the frame for inputting driving force to provide forward translation of the bicycle. An electric motor for generating driving force is also supported by the frame. A battery for charging the electric motor is likewise supported by the frame. A controller is provided for controlling rotational torque produced by the electric motor. An indicator is coupled to the controller. The indicator comprises a plurality of light emitting diodes for indicating a charge condition of the battery. A front cover unit is disposed substantially near the steering shaft. The front cover unit defines an interior space that contains the controller and the indicator at least partially therein. In addition, the front cover unit comprises a front surface cover member and a rear surface cover member. The front surface cover member is coupled to the rear surface cover member. In this embodiment, the controller and the indicator are at least partially attached to an interior surface of the rear surface cover member of the front cover unit.

BRIEF DESCRIPTION OF THE DRAWINGS

These and other features, aspects, and advantages of the present invention will now be described in connection with a preferred embodiment of the invention shown in the accompanying drawings. The illustrated embodiment, however, is merely an example and is not intended to limit the invention. The drawings include nine figures.

DETAILED DESCRIPTION OF THE PREFERRED EMBODIMENTS

Figure 1:
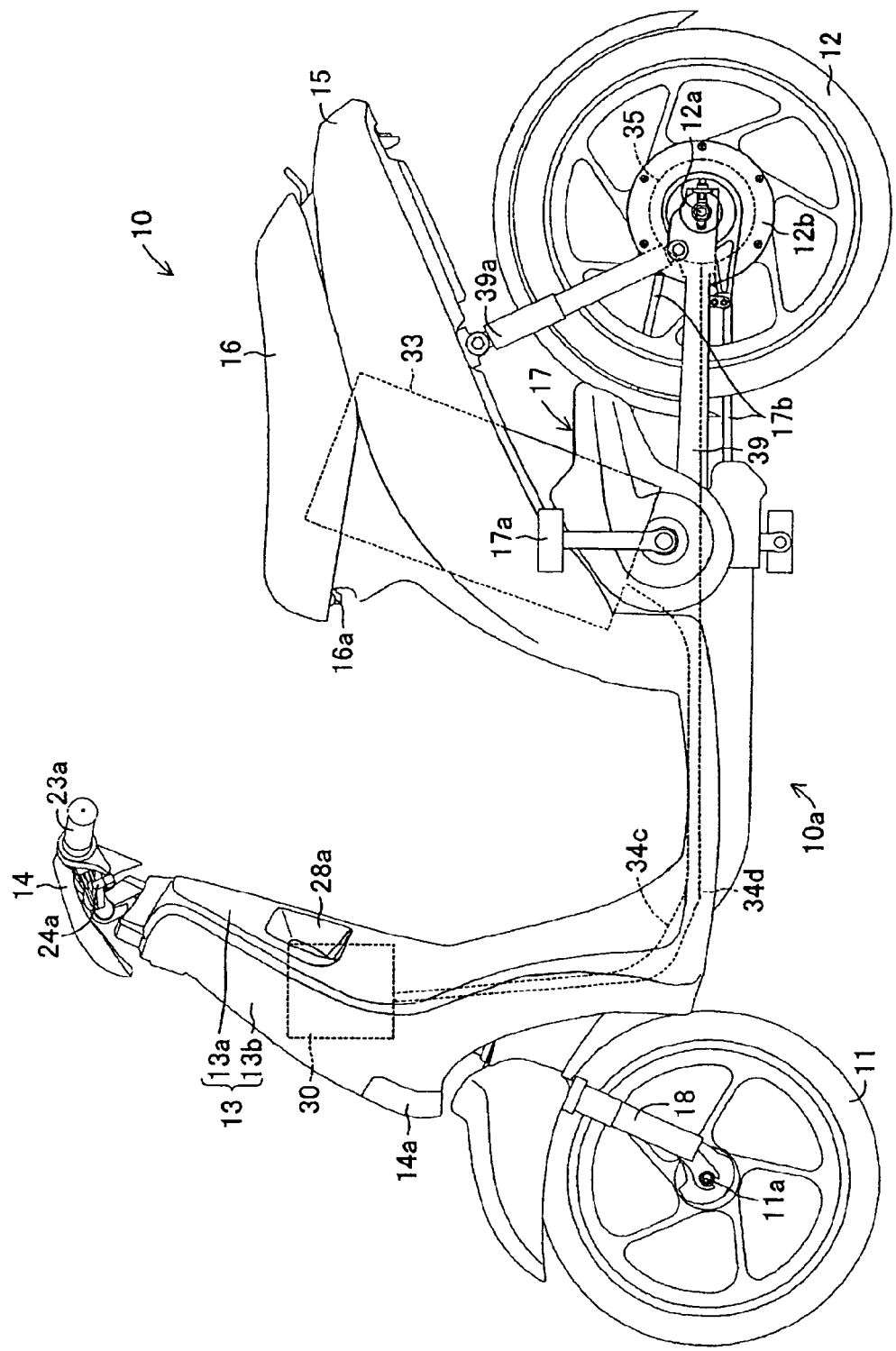
FIG. 1 is a side elevational view of an electric bicycle having a front cover unit configured in accordance with a preferred embodiment of the present invention.
Figure 2:
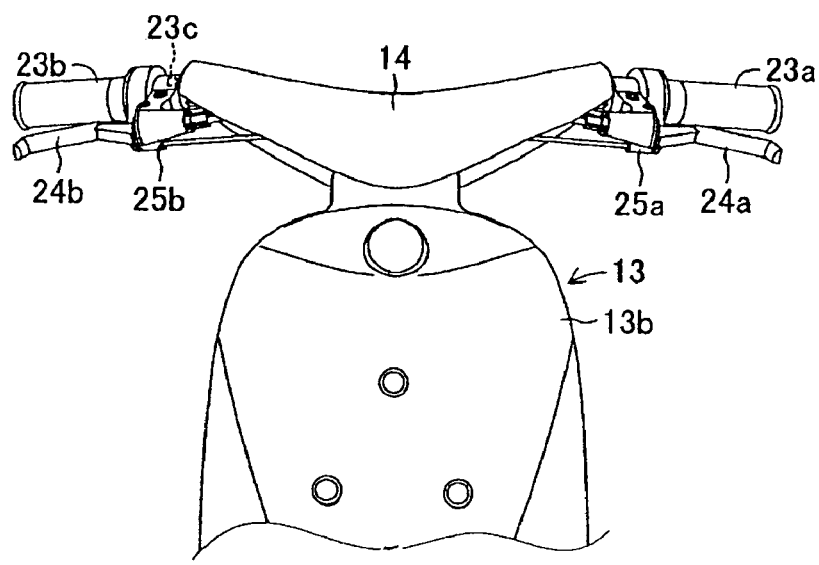
FIG. 2 is a front elevational view of an upper portion of the electric bicycle having a front cover unit of FIG. 1.

Embodiments of the present invention will now be described with reference to the accompanying drawings. FIG. 1 shows an electric bicycle 10 configured in accordance with an embodiment of the present invention. The electric bicycle 10 can include a pair of wheels including a front wheel 11 (disposed at a fore end of the bicycle) and a rear wheel 12 (disposed at an aft end of the bicycle), which are attached to a vehicle body 10a of the electric bicycle 10. The vehicle body 10a can comprises a frame that provides structural support for several components of the electric bicycle 10. Handlebars 14 can extend above a top portion of a front cover unit 13 which forms a front side portion of the vehicle body 10a. A light 14a can be disposed in a central area of a front surface of the front cover unit 13. A seat 16 can be positioned in a top area of a rear cover unit 15 which forms a rear side portion of the body 10a. The seat 16 can be configured to seat at least one rider. A pedal section 17, with which a rider inputs the driving force for the electric bicycle 10, can be attached to the vehicle body 10a at a location generally below a front side of the rear cover unit 15.

At a front portion of the electric bicycle 10, lower end portions of a front fork 18 can be bifurcated downward to journal the front wheel 11 for rotation. In other words, respective lower ends of the front fork 18 can support respective lateral ends of an axle 11a of the front wheel 11 for rotation. As a result, the front wheel 11 can rotate about a generally horizontal axis defined by its axle 11a.

Figure 4:
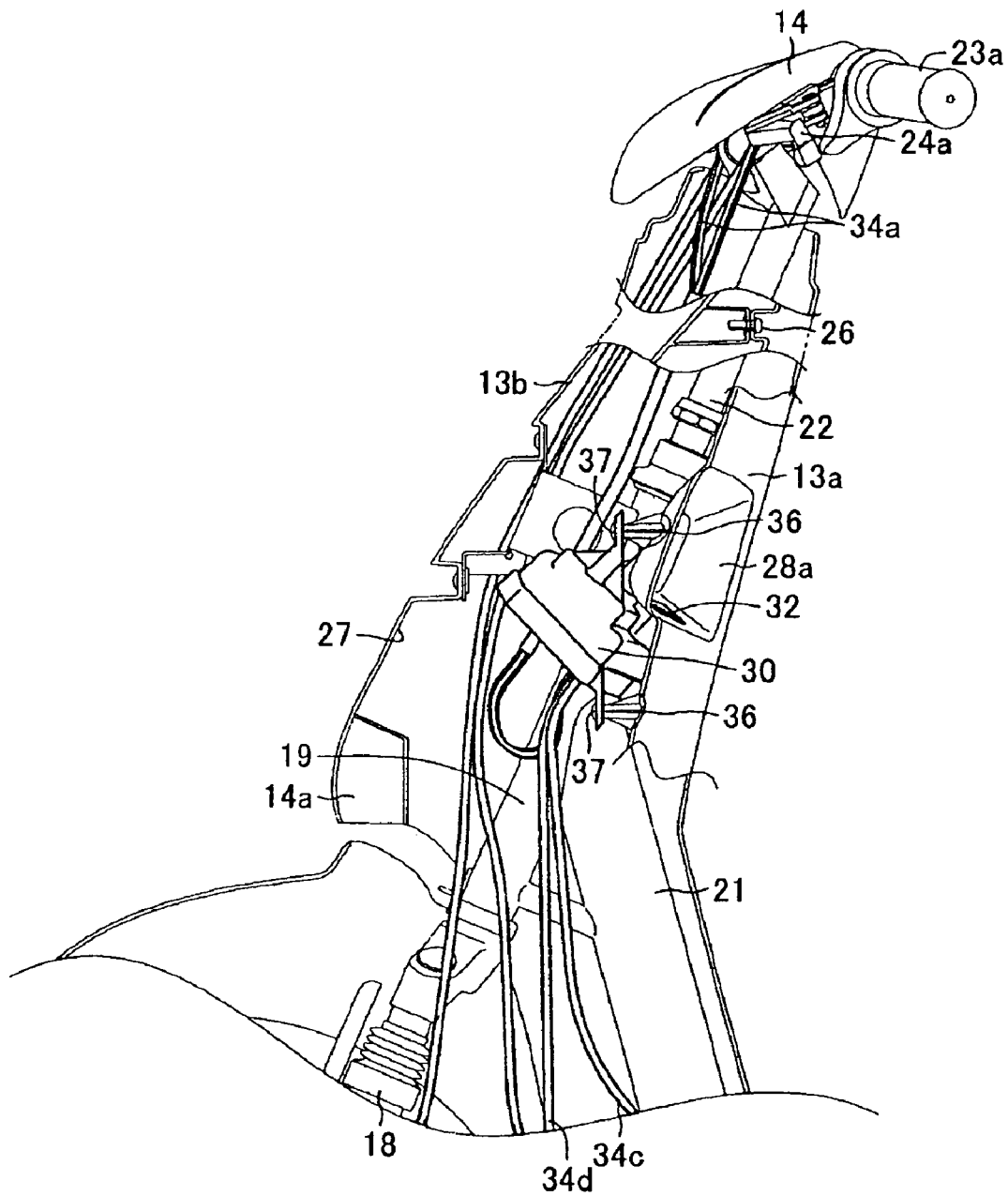
FIG. 4 is a side elevational view of the electric bicycle of FIG. 1 showing an interior portion of the front cover unit.
Figure 5:
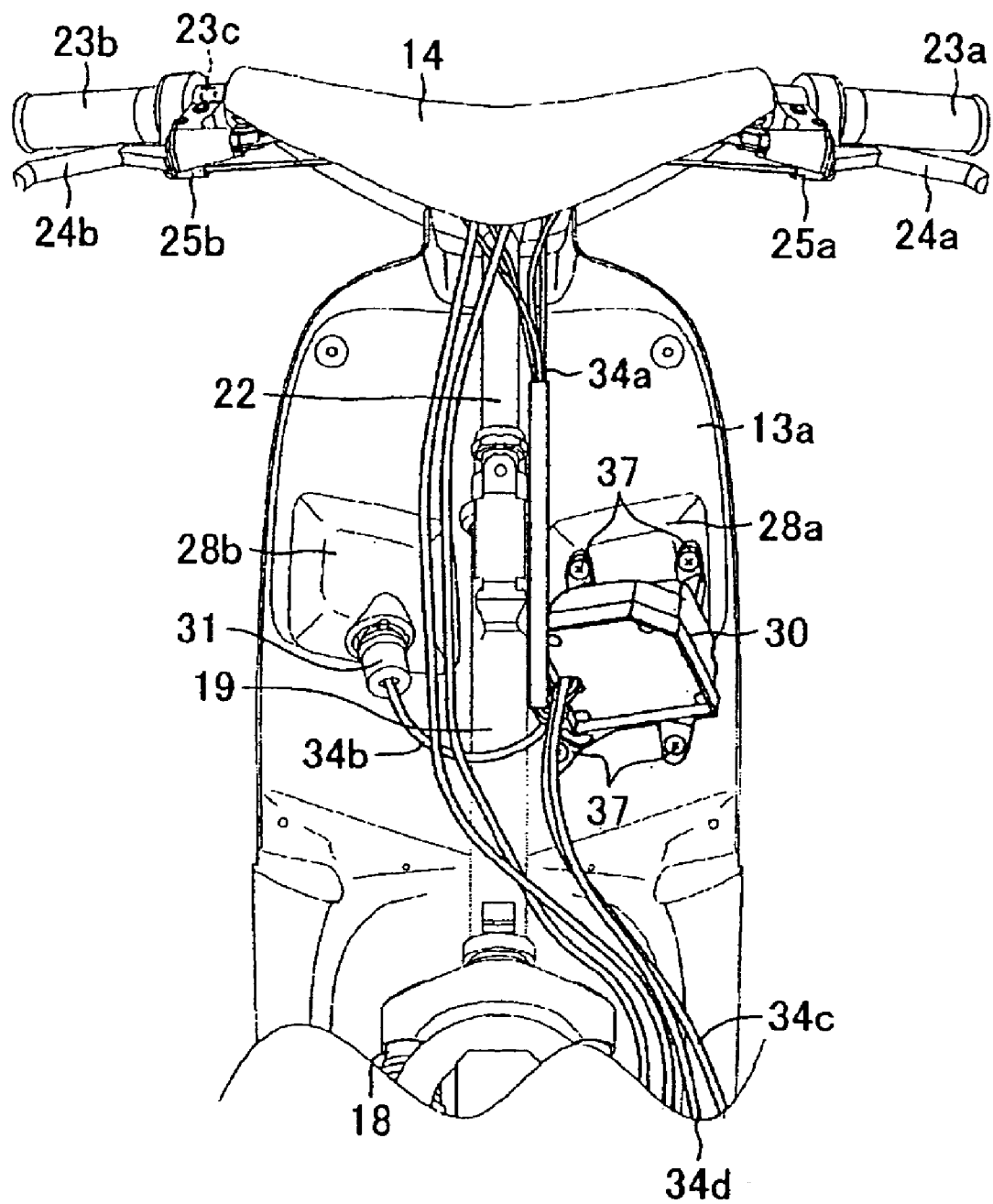
FIG. 5 is a front elevational view of the electric bicycle of FIG. 1 showing the front cover unit without a front surface cover member.

With reference to FIGS. 4 and 5, a top end portion of the front fork 18 can have a head pipe 19. The head pipe 19 is coupled with a front end portion (e.g., a top end portion) of a down tube 21 which forms a portion of the structure of the vehicle body 10a. A steering shaft 22 can extend through the head pipe 19 for pivotal movement about its axis. A lower end portion of the steering shaft 22 can be coupled with a center of the top end portion of the front fork 18. A top end portion of the steering shaft 22 can protrude upward from a top end portion of the head pipe 19. The handlebars 14 can be coupled with the top end portion of the head pipe 19. Therefore, the rider can operate the handlebars 14 to pivot the steering shaft 22 about an axis thereof. Accordingly, the front wheel 11 can turn to the right or to the left in response to the pivotal movement of the steering shaft 22.

As shown in FIG. 5, left and right ends of the handlebars 14 individually have grips 23a, 23b, respectively. In one embodiment, the grips 23a, 23b are fixed to the respective handlebars 14 so that the rider can hold them with his or her hands. The grip 23b can be pivotable about its axis to also function as an accelerator of the electric bicycle 10. Brake levers 24a, 24b can be disposed adjacent to the respective grips 23a, 23b and can be disposed at least partially apart from the associated grips 23a, 23b. When the brake levers 24a, 24b are pulled up to the respective grips 23a, 23b by the rider of the electric bicycle 10, the rotation of the front wheel 11 and the rear wheel 12 can be stopped.

A potentiometer 23c can function as an acceleration detection device (or an accelerator operational amount detecting device) and can be disposed in the handlebars 14d adjacent to the grip 23b to detect a rotational operation amount of the grip 23b. Brake switches 25a, 25b can function as brake operation detection devices (or as a brake operation detecting device) and can be connected to the respective brake levers 24a, 24b to detect whether the respective brake levers 24a, 24b are being operated at a particular time during operation of the electric bicycle 10.

With reference to FIGS. 1 through 5, in the illustrated embodiment, the front cover unit 13 can be formed with a rear surface cover member 13a that defines a rear surface and a front surface cover member 13b that defines a front surface. In one embodiment, the rear surface cover member 13a and the front surface cover member 13b are coupled with each other by screws 26. An internal space 27 can be defined between the rear and front surface cover members 13a, 13b. The head pipe 19, a portion of the down tube 21, the steering shaft 22, the controller 30, the power switch 31, and other components of the electric bicycle 10 can be disposed in the internal space 27 of the front cover unit 13.

Figure 3:
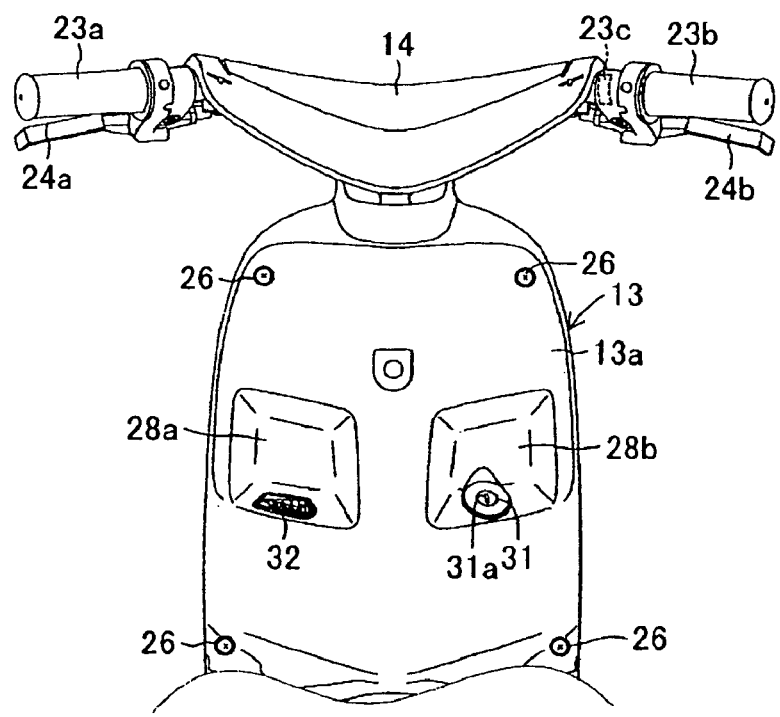
FIG. 3 is a rear elevational view of an upper portion of the electric bicycle having a front cover unit of FIG. 1.

As shown in FIGS. 3 and 5, rectangular recessed portions 28a, 28b can be formed on both the right and left sides of the rear surface cover member 13a that interposes the head pipe 19 and the steering shaft 22. FIG. 5 shows an interior side of the rear surface cover member 13a viewed from a front location by removing the front surface cover member 13b. In the embodiment shown in FIG. 5, the recessed portions 28a, 28b project forward. Each recessed portion 28a, 28b can have a vertical front surface and four slant surfaces slantingly extending from four edge lines of the front surface to a primary surface of the rear surface cover member 13a.

Figure 6:
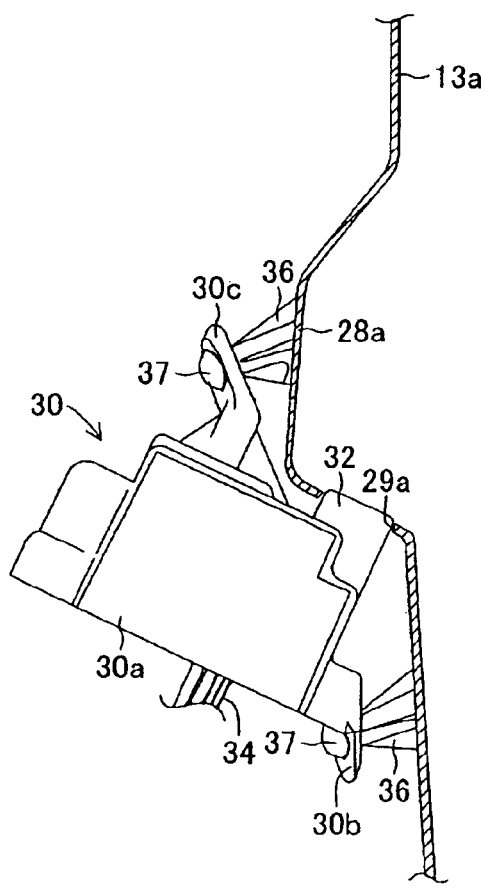
FIG. 6 is a cross-sectional view of a portion of the front cover unit of the electric bicycle of FIG. 1 showing a controller attached to a rear surface cover member of the front cover unit.
Figure 7:
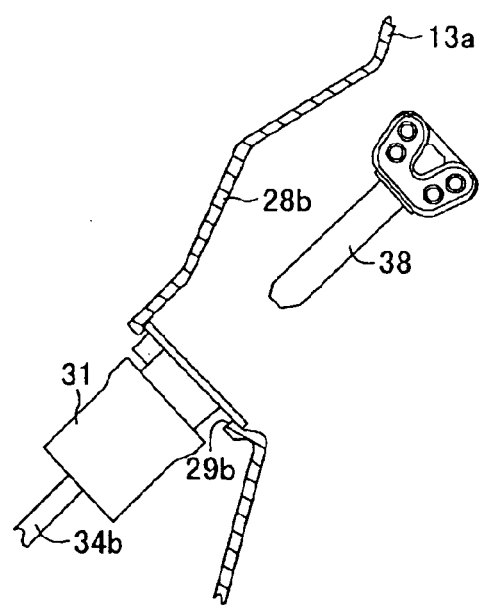
FIG. 7 is a cross-sectional view of a portion of the front cover unit of the electric bicycle of FIG. 1 showing a power switch attached to a rear surface cover member of the front cover unit.

With reference to FIGS. 6 and 7, a window 29a can be formed in one of the slant surfaces that face upward and is positioned at the bottom of the recessed portion 28a. Another window 29b can be formed in another slant surface that also faces upward and is positioned at the bottom of the recessed portion 28b. In the illustrated embodiment of the electric bicycle 10, a controller 30 having an indicator 32 can be fastened to an interior surface of the rear surface cover member 13a at a position adjacent to the window 29a so that the indicator 32 is exposed outside through the window 29a. In another embodiment, a power switch 31 can be fastened to the interior surface to be exposed outside through the window 29b.

Figure 8:
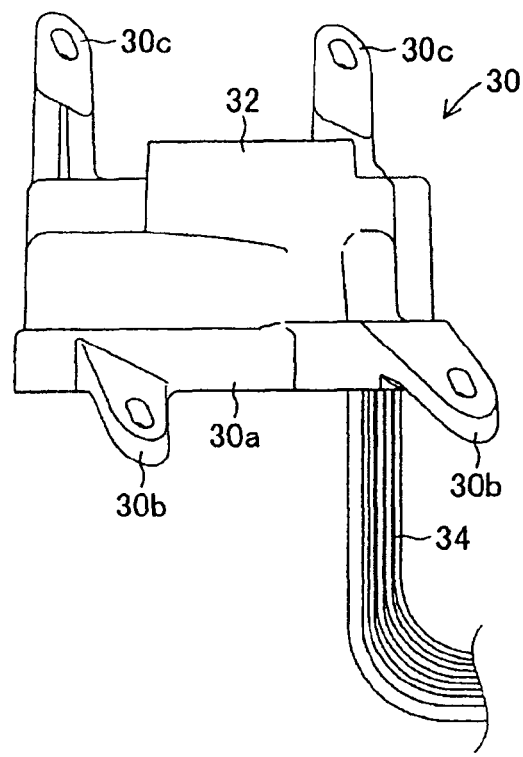
FIG. 8 is a front elevational view of a controller having an indicator of the electric bicycle of FIG. 1.
Figure 9:
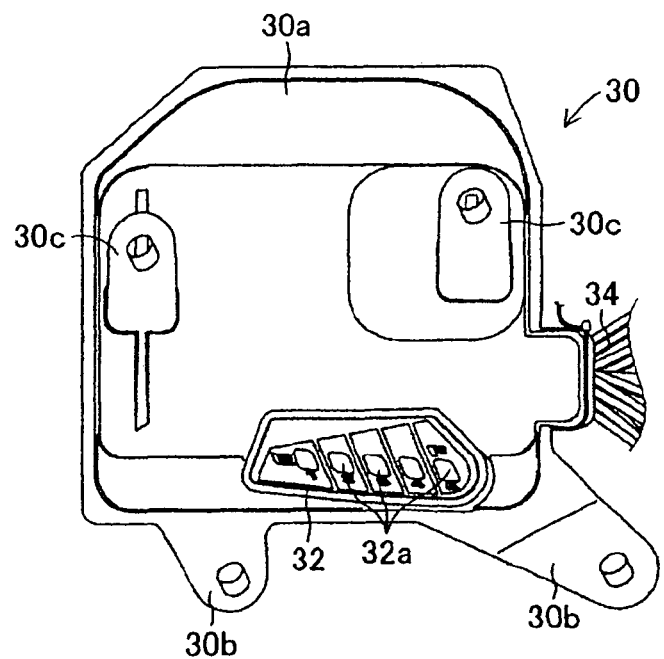
FIG. 9 is a top plan view of the controller having an indicator of FIG. 8.

As shown in FIGS. 8 and 9, the controller 30 can be a device that is configured to electrically control a drive system of the electric bicycle 10. Accordingly, in the illustrated embodiment, the controller 30 can have a pair of fastening pieces 30b disposed at bottom portions of one side of a controller body 30a. Each of the fastening pieces 30b preferably has a screw hole. In addition, the controller 30 can have a pair of fastening pieces 30c disposed at top portions of another side of the controller body 30a. In one embodiment, the indicator 32 is positioned at a top portion of the one side of the controller body 30a. The controller body 30a can have a container that incorporates electronic parts which form the controller 30 and the indicator 32 in the interior thereof.

A plurality of light emitting diodes (LEDs) 32a can be attached to a surface of the indicator 32 to indicate a charge condition of the battery 33. The LEDs 32a can be arranged so that at least some of the LEDs 32a illuminate in accordance with the charge condition of the battery 33. For example, if the battery 33 is sufficiently charged when the controller 30 is under the active condition, all the LEDs 32a will illuminate. When the charge amount of the battery 33 decreases, the LEDs 32a can deactivate and thus no longer be in an illuminated state. In one embodiment, the LEDs 32a deactivate one after another starting from the LED 32a positioned at the right side of the indicator 32. Of course those of skill in the art will recognize that in modified embodiments the indicator 32 can be arranged in a variety of different manners and/or utilize different components for providing a visual indication of the charge condition of the battery 33.

In the illustrated embodiment of the electric bicycle 10, a plurality of lead wires 34 are connected to the controller 30. As seen in FIG. 5, a lead wire 34a can be connected to the potentiometer 23c and the brake switches 25a, 25b, and a lead wire 34b can be connected to the power switch 31. In addition, a lead wire 34c can be connected to the battery 33 and a lead wire 34d can be connected to the electric motor 35. As seen in FIGS. 6 and 7, a portion of the internal surface of the rear surface cover member 13a adjacent to the window 29a can have bosses 36 positioned at certain intervals. In one embodiment, screws 37 can be inserted into the screw holes of the fastening pieces 30b, 30c and screwed into the bosses 36. As a result, the controller 30 can be fixed to the rear surface cover member 13a. Advantageously, the screws 37 do not extend out of the rear surface cover member 13a and thus are not exposed to the exterior of the electric bicycle 10.

With reference to FIGS. 5 and 7, the power switch 31 can be attached to a peripheral edge around the window 29b under a condition that a key receiving opening 31a (as shown in FIG. 3) is exposed and can be accessed by a rider of the electric bicycle 10. Upon inserting a key 38 into the key receiving opening 31a and turning the key 38 in one particular direction, the controller 30 allows the battery 33 to supply power to the electric motor 35. Meanwhile, upon turning the key 38 in an opposite direction, the controller 30 can prevent the battery 33 from supplying power to the electric motor 35.

A rear portion of the down tube 21, whose front end portion is coupled with the head pipe 19, can extend obliquely rearward downward from the coupling portion with the head pipe 19 and can curve to extend horizontally. A pair of rear frames (which are not shown in FIGS. 1 through 9) can be coupled with a rear end portion of the down tube 21. The rear frames can extend obliquely upward rearward in the rear cover unit 15. The rear frames can be spaced apart from each other and respective rear ends thereof are coupled with each other. The battery 33 can be placed between the respective rear frames.

With reference to FIG. 1, a rear arm 39 can be coupled with the rear end portion of the down tube 21 through a coupling member. The rear arm 39 can have a pair of arm members extending generally parallel to each other and coupled with each other at respective front end portions. The rear arm 39 can extend rearward. Rear end portions of the respective arm members of the rear arm 39 can support respective lateral ends of the axle 12a of the rear wheel 12 for rotation. The rear wheel 12 thus is rotatable about an axis of the axle 12a. Rear cushions 39a can extend between top ends of rear end portions of the respective arm members of the rear arm 39 and central portions of the respective rear frames. The rear end portions of the respective arm members of the rear arm 39 can be swingable by telescopic movements of the rear cushions 39a.

A transmission case 12b can be disposed in a center portion of the rear wheel 12. In one embodiment, an electric motor 35, reduction gears, and a drum brake are contained in the transmission case 12b. The electric motor 35 can operate via the controller 30 in response to an operational amount of the grip 23b to generate the driving force for the rear wheel 12. The electric motor 35 can stop its operation via the controller 30 when the brake levers 24a, 24b are operated.

With continued reference to FIG. 1, a chain 17b can be wound around a sprocket of the pedal section 17 and a sprocket of the rear wheel 12. When the rider rotates the pedals 17a, the driving force of human power is transmitted from the pedal section 17 to the rear wheel 12 through the chain 17b. The front wheel 11 and the rear wheel 12 can each have a brake. This brake, and the drum brake of the rear wheel 12, can apply a braking force to the associated front wheel 11 and rear wheel 12 in response to respective operational amounts of the brake levers 24a, 24b.

A bottom of a front end of the seat 16 can be disposed above the rear cover unit 15 can be pivotable with a hinge coupling 16a. In one embodiment, two spaces are defined in the interior of the rear cover unit 15. A first space can be for placing the battery 33 and a second space can be for placing a helmet or the like. In this embodiment, the rear cover unit 15 opens upward when the seat 16 is pivoted upward about an axis of the hinge coupling 16a. As a result, the rider can easily access the battery 33, the helmet or similar items stored beneath the seat 16. In addition, the rider can charge the battery 33 through the opening of the cover unit 15. The electric bicycle 10 can also have a pivotable stand to keep the electric bicycle 10 standing in an upright configuration. In addition, the rear end portion of the down tube 21 and the pedal section 17 can be covered with a cover member.

In one embodiment of use, when the rider uses the electric bicycle 10, the rider sits on the seat 16, inserts the key 38 into the key receiving opening 31a of the power switch 31 and turns it in a particular direction. As a result, the controller 30 is activated. The rider can check the charge condition of the battery 33 by looking at the indicator 32 because the indicator 32 can illuminate when the controller 30 is activated. Then, the rider puts his or her feet on the respective pedals 17a. If the rider wants to operate the electric bicycle 10 as a bicycle on a horizontal road or on a down slope, the rider can rotate the pedals 17a to transmit driving force to the rear wheel 12.

When the rider wants to decrease the operating speed of the electric bicycle 10, the rider can operate the brake levers 24a, 24b to generate a braking force. Accordingly, the electric bicycle 10 decreases its speed in response to the respective operational amounts of the brake levers 24*a*, 24*b*. If the rider wants to operate the electric bicycle 10 while having the electric motor 35 generate the driving force thereof (e.g., on an upslope or the like), the rider can operate the grip 23*b* in accordance with a desired speed. Under this condition, if the rider maintains his or her feet on the pedals 17*a* and does not rotate them, a one-way clutch disposed on the rear wheel 12 side prevents the rotation of the electric motor 35 from being transmitted to the pedals 17*a* through the chain 17*b*. However, the rider can continue to rotate the pedals 17*a* with his or her own feet if the rider so chooses. Advantageously, when the electric motor 35 is operating, a relatively small force generated by the rider through the pedals can operate the electric bicycle 10 in a relatively high speed range.

When the rider wants to decrease the operating speed of the electric bicycle 10 under the condition that the electric motor 30 rotates the rear wheel 12, the rider can operate the brake levers 24*a*, 24*b* so that the controller 30 controls the electric motor 35 to stop. After the electric motor 35 stops, the rider can continuously operate the brake levers 24*a*, 24*b* to further decrease the speed in response to the respective operational amounts of the brake levers 24*a*, 24*b*. When the rider wants to stop the running of the electric bicycle 10, the rider turns the key 38 in the opposite direction to deactivate the controller 30. Then, the rider pivots the stand downward toward the ground; therefore, the electric bicycle 10 can maintain an upright position with respect to the ground.

If the indicator 32 indicates that the charge amount of the battery 33 has decreased, the rider can connect a charge cable to the battery 33 in order to charge the battery 33. Specifically, the rider pivots the seat 16 so that the rear cover unit 15 opens upward. Then, the rider connects the battery 33 to the power source using the charge cable. During charging of the battery 33, the seat 16 is lowered to close the interior spaces of the rear cover unit 15. In one embodiment, the charge cable extends outside through a gap between the rear cover unit 15 and the seat 16.

In one embodiment, as shown in FIG. 4, the indicator 32 is attached to the controller 30 and is placed in the interior of the front cover unit 13. Thus, a single container can house both the indicator 32 and the controller 30 to protect each component from water and dust. This configuration provides several advantages over prior art bicycles having controllers and indicators housed in separate containers often a significant distance from one another on the electric bicycle. First, such a simple structure can protect the indicator 32 and the controller 30 and, at the same time, reduce production and manufacturing costs because the components in the electric bicycle are reduced by having a controller 30 having an indicator 32 housed in a single front cover unit. Second, manufacturing and productions costs associated with the present electric bicycle 10 can be further reduced because the wiring circuit connecting the indicator 32 and the controller 30 to each other can be relatively short since the indicator 32 is attached to the controller 30. Third, specific members to which the indicator 32 and the controller 30 are fastened are not necessary since the indicator 32 and the controller 30 can be fastened to an interior portion of the front cover unit 13. Advantageously, the fastening structure for the indicator 32 and the controller 30 thus can be simpler than those in prior art electric bicycles.

In another embodiment, as illustrated in FIG. 6, the rear surface cover member 13*a*, which forms a rear portion of the front cover unit 13, has the window 29*a*. In this embodiment, the controller 30 is disposed in the internal space 27 of the front cover unit 13 with the indicator 32 exposed outside through the window 29*a*. Advantageously, the rider can easily watch the indicator 32 while sitting on the seat 16, and the controller 30 can be effectively protected from water and dust. In addition, the controller 30 can be fastened to the bosses 36 formed in the internal surface of the rear surface cover member 13*a* by the screws 37. Accordingly, the screws 37 are not exposed outside of the front cover unit 13. Advantageously, the aesthetic appearance of the front cover unit 13 is not affected by the presence of the screws 37.

In one embodiment, as shown in FIGS. 4 and 5, the front surface cover member 13*b* is detachably attached to the rear surface cover member 13*a* by the screws 26. As a result, the controller 30 attached to the rear surface cover member 13*a* can be exposed outside by detaching the front surface cover member 13*b* from the rear surface cover member 13*a* (which is illustrated in FIG. 5). Accordingly, the controller 30 can be easily accessed for inspection, maintenance, repair, and the like. In addition, the indicator 32 does not protrude out of the rear surface cover member 13*a*. Advantageously, the aesthetic appearance of the rear surface cover member 13*a* is not affected by the presence of the indicator 32 within the front cover unit 13 because the window 29*a*, through which the indicator 32 is exposed outside, is formed in the surface of the recessed portion 28*a*.

As illustrated in FIGS. 3, 6, and 7, the rear surface cover member 13*a* can have a first recessed portion 28*a* and a second recessed portion 28*b* both transversely placed side by side so as to oppose each other. The second recessed portion 28*b* has a window 29*b* facing upward, and the power switch 31 can be placed in the window 29*b*. According to this arrangement, the power switch 31 does not protrude out of the rear surface cover member 13*a*. Advantageously, the aesthetic appearance of the rear surface cover member 13*a* is not affected by the presence of the power switch 31. In addition, the power switch 31 and the controller 30 having the indicator 32 can be compactly arranged. Sufficient room for the rider can be secured because the power switch 31 is disposed in the recessed portion 28*b*. Advantageously, the knee or knees of the rider will not touch the power switch 31 during operation of the electric bicycle 10. In addition, the rider can easily operate the power switch 31 because the power switch 31 is positioned on the surface of the recessed portion 28*b* facing upward toward the rider of the electric bicycle 10.

In another embodiment of the present invention, as seen in FIG. 5, the handlebars 14 have the grip 23*b* and the potentiometer 23*c*, and the potentiometer 23*c* and the controller 30, which is placed in the interior of the front cover unit 13, connected to each other by the lead wire 34*a*. Thereby, the lead wire 34*a* can be relatively short and can be easily installed. In addition, the handlebars 14 have the brake levers 24*a*, 24*b* and the brake switches 25*a*, 25*b* for detecting that the brake levers 24*a*, 24*b* are operated. The brake switches 25*a*, 25*b* and the controller 30 can be connected to each other by the lead wire 34*a*. Likewise, the lead wire 34*a* can be relatively short and can be easily installed.

Certain features and aspects of the embodiment described above and can be modified in accordance with a rider's particular preferences. For example, in one embodiment discussed above, the charge condition of the battery 33 is indicated by the LEDs 32*a* of the indicator 32. However, the indicator 32 can indicate various other operational conditions of the bicycle 10 other than the charge condition of the battery 33 including, for example, a vehicle speed and an on-off state of the light 14*a*. Additionally, other visual indicators such as lamps or the like can replace the LEDs 32*a*. Further, seal members can be inserted into the boundary portion between the peripheral edge of the window 29*a* and the indicator 32 or the boundary portion between the peripheral edge the window 29b and the power switch 31 to sufficiently seal the boundary portions.

In the embodiments described above, the indicator 32 can be exposed outside through the rear surface cover member 13a. However, the indicator 32 can also be exposed outside through the front surface cover member 13b. The fasteners that fasten the controller 30 to the front cover unit 13 are not limited to the screws 37. Any other fasteners can be used if they are usable for fastening the controller 30 to the front cover unit 13. In addition, other portions of the electric bicycle can be properly modified or varied within the technical scope of the present invention.

Various components are described as being "connected" or "operatively connected". It should be appreciated that this is a broad term that includes physical connections (e.g., electrical wires) and non-physical connections (e.g., radio or infrared signals). It should also be appreciated that "connected" or "operatively connected" includes direct connections and indirect connections (e.g., through an additional intermediate device).

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. An electric bicycle comprising:
a body that includes a frame,
a steering shaft that is pivotable about an axis defined by the steering shaft,
handlebars coupled to an upper portion of the steering shaft,
a seat supported by the frame,
a pedal section supported by the frame and configured to input a drive force,
an electric motor supported by the frame and configured to generate a drive force,
a controller configured to control rotational torque produced by the electric motor,
an indicator directly mounted to the controller, the indicator configured to visually indicate an operational condition of the bicycle, and
a front cover unit configured to at least partially surround the steering shaft, the front cover unit comprising a front surface cover member and a rear surface cover member, the front and rear surface cover members are coupled together to define an internal space therebetween, the front and rear surface cover members together surround the steering shaft, wherein the controller is positioned within the internal space and the controller and the indicator are coupled to the front cover unit.

2. The electric bicycle of claim 1, wherein the front cover unit comprises a window in the rear surface cover member and the indicator is exposed to an exterior of the front cover unit through the window.

3. The electric bicycle of claim 2, wherein the controller is coupled to the rear surface cover member by a fastener.

4. The electric bicycle of claim 2, wherein the front surface cover member is detachably coupled to the rear surface cover member.

5. The electric bicycle of claim 2, wherein the rear surface cover member has a recessed portion including a surface that faces generally upward, and the window is formed on the surface of the recessed portion that faces generally upward.

6. The electric bicycle of claim 5, wherein the recessed portion is positioned on one of a right or left side of the rear surface cover member relative to the steering shaft, and the front cover further comprises a second recessed portion including a second surface that faces generally upward and is positioned on the other of the right or left side of the rear surface cover member from the recessed portion, the second surface includes a second window, and a power switch arranged to stop and start the electric motor is exposed through the second window.

7. The electric bicycle of claim 1, wherein the handlebars include an accelerator and an accelerator detection device configured to detect an operational amount of the accelerator, and the accelerator detection device and the controller are operatively connected to each other by a lead wire through which a detection signal detected by the accelerator detection device is transmitted to the controller.

8. The electric bicycle of claim 1, wherein the handlebars include a brake operator and a brake detection device configured to detect an operation of the brake operator, and the brake detection device and the controller are operatively connected to each other by a lead wire through which a detection signal detected by the brake detection device is transmitted to the controller.

9. The electric bicycle of claim 1, further comprising a front wheel that is supported by the frame at a front end of the bicycle, wherein the controller is positioned above the front wheel when viewed in a transverse direction of the bicycle.

10. An electric bicycle comprising:
a body that includes a frame,
a wheel that is supported by the frame at a rear end of the bicycle, the wheel arranged to rotate about a generally horizontal axis,
a steering shaft disposed generally near a fore end of the bicycle and pivotable about an axis defined by the steering shaft,
handlebars coupled to the steering shaft,
a seat supported by the frame and configured for supporting at least one rider,
a pedal supported by the frame and configured to input a driving force to provide forward translation of the bicycle,
an electric motor supported by the frame and configured to generate a driving force,
a battery supported by the frame and configured to drive the electric motor,
a controller configured to control rotational torque produced by the electric motor,
an indicator operatively coupled to the controller and configured to indicate an operational condition of the electric bicycle, and a front cover unit disposed substantially near the steering shaft, the front cover unit comprising a front cover member and a rear cover member that are coupled together to define an interior space, the controller and the indicator at least partially positioned within the interior space and adjacent to the steering shaft, wherein the front and rear cover members together surround the steering shaft.

11. The electric bicycle of claim 10, wherein the indicator comprises a plurality of light emitting diodes (LEDs) for indicating a charge condition of the battery.

12. The electric bicycle of claim 10, wherein the indicator is at least partially coupled to the controller.

13. The electric bicycle of claim 10, wherein the front cover member can be detached from the rear cover member.

14. The electric bicycle of claim 10, wherein the controller and the indicator are coupled to an interior surface of the rear cover member.

15. The electric bicycle of claim 14, further comprising at least one fastener disposed within the interior space defined by the front cover unit for fastening the controller and the indicator to the rear cover member.

16. The electric bicycle of claim 10, wherein the rear cover member has a first recessed portion including a first surface that faces at least partially upward and a first window is disposed on the first surface for exposing at least a portion of the indicator.

17. The electric bicycle of claim 16, further comprising a second recessed portion including a second surface that faces at least partially upward and a second window is disposed on the second surface for exposing at least a portion of a power switch for starting and stopping the electric motor.

18. The electric bicycle of claim 17, wherein the first recessed portion is disposed on a first side of the rear cover member relative to the steering shaft and the second recessed portion is disposed on a second side of the rear cover member relative to the steering shaft.

19. The electric bicycle of claim 18, wherein the first side of the rear cover member comprises a left side of the rear cover member and the second side of the rear cover member comprises a right side of the rear cover member.

20. An electric bicycle comprising:
a body including a frame,
a wheel supported by the frame, the wheel arranged to rotate about a generally horizontal axis,
a steering shaft disposed generally near a fore end of the bicycle and pivotable about an axis defined by the steering shaft,
handlebars coupled to the steering shaft,
a seat supported by the frame,
a pedal configured to input a driving force to the wheel,
an electric motor supported by the frame and configured to generate a driving force to the wheel,
a battery supported by the frame and operatively coupled to the electric motor,
a controller configured to control at least a rotational torque produced by the electric motor,
an indicator directly mounted to the controller, and
a front cover unit disposed substantially near the steering shaft, the front cover unit surrounding the steering shaft and defining an interior space and containing the controller and the indicator at least partially therein, wherein the front cover unit comprises a front surface cover member and a rear surface cover member and the front surface cover member is coupled to the rear surface cover member, the controller and the indicator being at least partially attached to an interior surface of the rear surface cover member.

* * * * *